US007281252B1

(12) United States Patent
Lindquist et al.

(10) Patent No.: US 7,281,252 B1
(45) Date of Patent: Oct. 9, 2007

(54) METHOD, SYSTEM, AND APPARATUS FOR IMPLEMENTING OBJECT INTERFACES AT RUNTIME

(75) Inventors: Joshua Lindquist, Bellevue, WA (US); Daniel Galen Simmons, Sammamish, WA (US); Li Wang, Kirkland, WA (US); Eric Barber Vigesaa, Seattle, WA (US); Gloria Monroe Godfrey, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 764 days.

(21) Appl. No.: 10/387,293

(22) Filed: Mar. 12, 2003

(51) Int. Cl.
*G06F 13/00* (2006.01)

(52) U.S. Cl. ............... 719/332; 719/330; 719/331; 719/315; 718/104

(58) Field of Classification Search .......... 719/310, 719/311, 313, 315, 316, 317, 318, 328, 330, 719/332, 331; 718/104
See application file for complete search history.

(56) References Cited

U.S. PATENT DOCUMENTS

| 6,230,160 B1* | 5/2001 | Chan et al. ............ 707/103 X |
| 6,304,918 B1 | 10/2001 | Fraley et al. ............ 709/322 |
| 6,463,442 B1 | 10/2002 | Bent et al. ............ 707/103 R |
| 6,519,764 B1 | 2/2003 | Atkinson et al. ........... 717/120 |
| 6,757,707 B1 | 6/2004 | Houghton et al. .......... 709/217 |
| 6,775,700 B2* | 8/2004 | Cheng et al. ............ 709/225 |
| 6,877,163 B1* | 4/2005 | Jones et al. ............ 719/332 |
| 6,947,965 B2* | 9/2005 | Glass ........................ 709/203 |
| 6,951,021 B1* | 9/2005 | Bodwell et al. ........... 719/316 |
| 6,993,569 B1 | 1/2006 | Rees, Jr. ............ 709/217 |
| 7,055,153 B2* | 5/2006 | Beck et al. ............ 719/315 |
| 7,058,599 B2 | 6/2006 | Hanks et al. ............ 705/27 |
| 7,076,518 B1 | 7/2006 | Twede ........................ 709/201 |
| 7,131,063 B2 | 10/2006 | Mateos ........................ 715/513 |
| 2002/0004856 A1* | 1/2002 | Sudarshan et al. .......... 709/330 |
| 2002/0144012 A1* | 10/2002 | Hoennig et al. ............ 709/315 |
| 2002/0163520 A1* | 11/2002 | Hardin et al. ............ 345/475 |
| 2003/0115373 A1* | 6/2003 | Beck et al. ............ 709/315 |
| 2003/0177170 A1* | 9/2003 | Glass ........................ 709/203 |

(Continued)

OTHER PUBLICATIONS

W.R. Stanek, "Energizing Your Web Pages" (the Liveconnect Technology In Netscape's Open Network Environment and Microsoft's ActiveX Technology for Creating Dynamic Web Pages), *PC Magazine*, Sep. 1997, vol. 16, No. 15, p. 247.

(Continued)

*Primary Examiner*—William Thomson
*Assistant Examiner*—Andy Ho
(74) *Attorney, Agent, or Firm*—Merchant & Gould

(57) ABSTRACT

A method, system, and apparatus for implementing object interfaces at runtime are provided. According to the method, a request is received for a resource that includes a client side object that supports an object interface. In response to the request, program code is generated that implements the interface. Once the program code implementing the object interface has been generated, the requested resource and the program code implementing the object interface are returned in response to the request for the resource. An intermediary object for mediating communication between objects is also generated and returned in response to the request. If the object interface implements an interface for consuming data, the object interface registers itself with the intermediary object as an event consumer. If the object interface implements a provider interface, the object interface calls the intermediary object in response to the occurrence of a specified type of event.

24 Claims, 12 Drawing Sheets

U.S. PATENT DOCUMENTS

2004/0111730 A1* 6/2004 Apte .................. 719/330

OTHER PUBLICATIONS

Z. Oliphant, "Plug-Ins For Netscape Navigator: Extend Navigator and Internet Explorer Using The Plug-In API," *PC Magazine*, Feb. 1997, vol. 16, No. 3, p. 233.

R. Dragan, "Plugging In: The Live connect/Plug-In SDK 3.0, The Netscape Navigator Platform," *PC Magazine*, Oct. 1996, vol. 15, No. 17, p. 284.

G. Attardi, A. Cisternino, A. Yonezawa, S. Matsuoka, "Template Metaprogramming An Object Interface To Relational Tables," REFLECTION 2001 International Conference, Lecture Notes In Computer Science, Sep. 2001, p. 266-267.

G. Xiao-Lin, Q. De-Pei, "Binding Agents Supporting Inter-Object Communication For Internet-Based Meta System," *Chinese Journal of Computers*, Jan. 2000, vol. 25, No. 1, p. 100-105.

H. Fahmi, "Distributed Web-Based Framework for Real-Time Multimedia Object Communication," *Computer Systems Science and Engineering*, Purdue University, W. Lafayette, Mar. 2001, vol. 16, No. 2, p. 79-88.

L. Courtrai, Y. Maheo, F. Raimbault, "Java Objects Communication On A High Performance Network," Proceedings Ninth Euromicro Workshop On Parallel and Distributed Processing, IEEE Computer Society, Feb. 2001, p. 203-210.

Zdun, Uwe, "Dynamically Generating Web Application Fragments From Page Templates," *Specification of Software Systems*, University of Essen, Germany, zdun@acm.org, pp. 1-11, 2002.

Meyer, Andrew; Taylor, Peter, "E-Commerce—An Introduction," Special Feature E-Commerce, *Computing & Control Engineering Journal*, Jun. 2000.

U.S. Office Action dated Jan. 11, 2007 cited in U.S. Appl. No. 10/675,173.

* cited by examiner

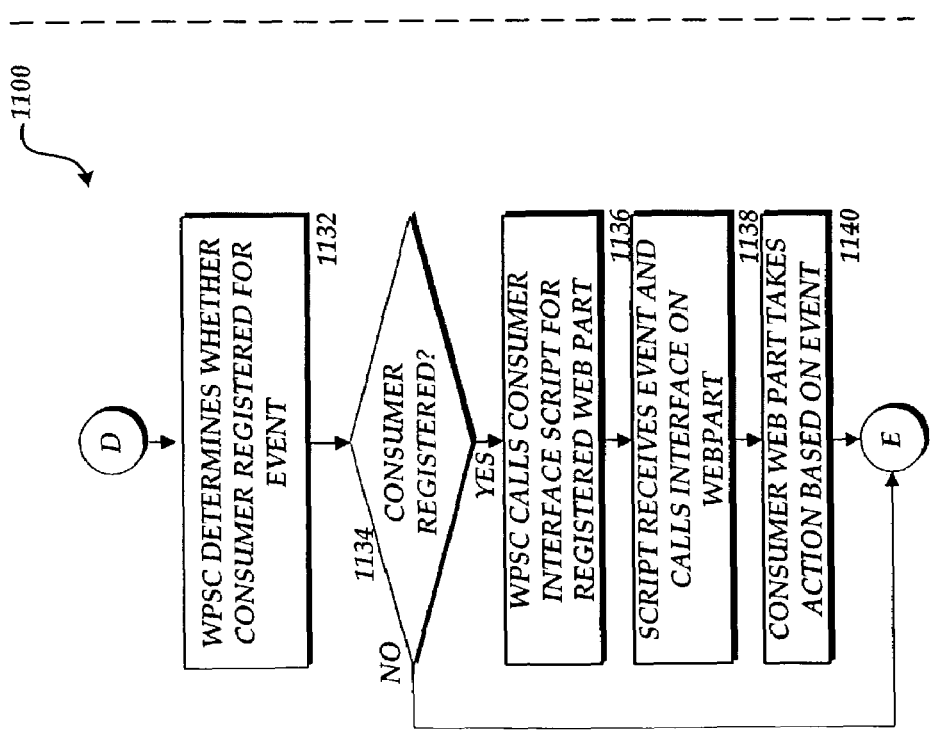

| Test1 | | | | |
|---|---|---|---|---|
| Suppliers | | | | |
| Refresh | Commands and Options... | Toolbar | | |
| Company Name | City | Country | Contact Name | Phone |
| Leka Trading | Singapore | Singapore | Chandra Leka | 555-8787 |
| Lyngbysild | Lyngby | Denmark | Niels Petersen | 4384108 |
| Ma Maison | Montréal | Canada | Jean-Guy Lauzon | (514) 555-9022 |
| Mayumi's | Osaka | Japan | Mayumi Ohno | (06) 431-7877 |
| New England Seafood Cannery | Boston | USA | Robb Merchant | (617) 555-3267 |
| New Orleans Cajun Delights | New Orleans | USA | Shelley Burke | (100) 555-4822 |
| Nord-Ost-Fisch Handelsgesellschaft mbH | Cuxhaven | Germany | Sven Petersen | (04721) 8713 |
| Norske Meierier | Sandvika | Norway | Beate Vileid | (0)2-953010 |
| Pasta Buttini s.r.l. | Salerno | Italy | Giovanni Giudici | (089) 6547665 |
| Pavlova, Ltd. | Melbourne | Australia | Ian Devling | (03) 444-2343 |
| PB Knäckebröd AB | Göteborg | Sweden | Lars Peterson | 031-987 65 43 |
| Plutzer Lebensmittelgroßmärkte AG | Frankfurt | Germany | Martin Bein | (069) 992755 |
| Refrescos Americanas LTDA | Sao Paulo | Brazil | Carlos Diaz | (11) 555 4640 |
| Specialty Biscuits, Ltd. | Manchester | UK | Peter Wilson | (161) 555-4448 |
| Svensk Sjöföda AB | Stockholm | Sweden | Michael Björn | 08-123 45 67 |
| Tokyo Traders | Tokyo | Japan | Yoshi Nagase | (03) 3555-5011 |

Products

Refresh | Commands and Options... | Toolbar

| SKU | Product Name | Unit Price | Units In Stock | Inventory Value |
|---|---|---|---|---|
| 4 | Chef Anton's Cajun Seas | $22.00 | 53 | $1,166.00 |
| 5 | Chef Anton's Gumbo Mix | $21.35 | 0 | $0.00 |
| 65 | Louisiana Fiery Hot Pepp | $21.05 | 76 | $1,599.80 |
| 66 | Louisiana Hot Spiced Okr | $17.00 | 4 | $68.00 |
| | | | | $2,833.80 |

Product Detail

Refresh | Commands and Options... | Toolbar

Name    Louisiana Fiery Hot Pepper Sauce

Package    32 - 8 oz bottles

Price    $21.05

In Stock    76

On Order    0

*Fig. 8*

METHOD, SYSTEM, AND APPARATUS FOR IMPLEMENTING OBJECT INTERFACES AT RUNTIME

TECHNICAL FIELD

The invention relates generally to the field of object interfaces and, more specifically, to the field of dynamically implementing interfaces for inter-object communication at runtime.

BACKGROUND OF THE INVENTION

During the infancy of the World Wide Web ("WWW" or the "Web"), hyper-text markup language ("HTML") was used almost exclusively for the presentation of Web pages within a Web browser. However, due to the limitations of HTML, technologies were created that enable the presentation of more robust information than permitted by HTML. These technologies, such as JAVA from SUN MICROSYSTEMS and ACTIVEX from MICROSOFT CORPORATION, allow client-side browser objects to be created that provide functionality not possible through the use of only HTML. JAVA applications ("applets") and ACTIVEX controls executing within a Web browser can provide rich graphics, animation, dynamic content, continuously updated content, and other types of robust data presentation not previously possible using only HTML. These types of client-side browser objects have greatly enhanced the presentation capabilities of today's Web browsers.

One difficulty encountered when utilizing client-side browser objects occurs when it is necessary to have two client-side objects communicate with one another. For instance, it may be desirable to have one object retrieve and display a list of available automobiles. When a user selects the name of an automobile, the name may be transmitted from the first object to a second object which is responsible for retrieving a graphic image of the selected automobile and for displaying the image within the Web browser. In order for this type of inter-object communication to occur, a programmer would typically create each of the objects in a manner that allows them to communicate by directly calling functions on each other. However, if an object is not present on the Web page or if an incorrect version of the called or calling object is present, the intended interaction between objects may not take place.

Another way for client-side objects to communicate is through the use of an intermediary object. For example, using Web Part Site technology from MICROSOFT CORPORATION, an intermediary object is included with each Web page. The intermediary object, called the Web part service component ("WPSC") provides a framework that allows, among other things, client-side objects configured for use with the WPSC (called "Web parts") to communicate with one another through the WPSC. By using the WPSC, objects can make calls into the framework for communicating with other objects. These calls are received by the WPSC and passed to other objects that have registered to receive such messages. The WPSC provides a standard framework for inter-object communication and frees programmers from having to write objects that directly communicate with each another.

Most client-side objects that utilize a central intermediary, such as the WPSC, implement a predefined and fixed set of object interfaces for communicating with the WPSC and other objects. However, in order to add support for additional interfaces in the future, the object may need to be reprogrammed to implement the desired interfaces. Alternatively, an object could support all of the available interfaces, but this requires the utilization of a substantial amount of resources for interfaces that may not even be used. Moreover, if all of the available interfaces were supported, there would still be no easy way for a solution provider to customize the implementation of the interfaces for a particular application without reprogramming the object.

Accordingly, there is a need for a method, system, and apparatus that allows object interfaces on client-side objects for inter-object communication to be dynamically implemented and customized at runtime. It is with respect to these considerations and others that the present invention has been made.

SUMMARY OF THE INVENTION

In accordance with the present invention, the above and other problems are solved by a method, system, and apparatus for dynamically implementing object interfaces at runtime. The present invention allows programmers to create client side objects for which an object interface for communicating with other objects can be defined and implemented at runtime without recoding the object.

In accordance with other aspects, the present invention relates to a method for implementing an object interface at runtime. According to the method, a request is received for a resource, such as a Web page, that includes one or more client side objects, such as Web parts. In response to the request, a determination is made as to whether an object interface should be implemented for the object at runtime. This may be accomplished by retrieving a data file, called the solution specification file, containing data that identifies and describes the object interfaces for the object, if any. If an object interface is to be provided, the solution specification file further includes parameters defining the implementation of the object interface to be implemented for the object.

If an object interface is to be implemented for the object at runtime, program code, such as a script executable within a Web browser, is generated that implements the interface. The program code may be generated based on the parameters defining the implementation contained in the solution specification file. Once the program code implementing the object interface has been generated, the requested resource and the program code implementing the object interface may be returned in response to the original request for the resource. The client side object included in the resource may also be returned in response to the request.

According to other aspects of the methods provided herein, an intermediary object, such as the WPSC, may also be generated and returned with the resource and the object code implementing the interface in response to the original request. The client side object, the intermediary object, and the code for implementing the object interface may then be executed, for instance on a client computer running a Web browser. If the object interface implements an interface for receiving data, called a consumer interface, the object interface registers itself with the intermediary object as an event consumer. In this manner, when certain types of events are generated, the intermediary object will pass the events to the object interface which, in turn, will pass the event to the client side object. If the object interface implements an interface for providing data, called a provider interface, the object interface will call the intermediary object in response to the occurrence of a specified type of event. It should be appreciated that both consumer and provider interfaces may be implemented on a single client side object.

In accordance with other aspects, the invention relates to a system for implementing an object interface at runtime. According to the system, a server computer is provided that is operative to receive requests for resources, such as Web pages, that include client side objects, such as Web parts. The server computer is also operative to determine whether an object interface should be generated at runtime for a requested resource based on the contents of a data file, called the solution specification file. If an object interface is to be generated at runtime, the server computer generates program code for implementing the object interface based on parameters contained in the solution specification file. The server computer then returns the requested resource and the program code for implementing the object interface in response to the request. The server computer may also provide the client side object itself in response to the request.

The system provided herein also includes a client computer. The client computer is operative to request and receive a resource containing a client side object from the server computer. The client computer is also operative to receive program code from the server implementing a runtime object interface for the client side object. When the client computer has received the resource, the client side object, and the program code implementing the object interface, the client computer is operative to render the resource, such as within a Web browser.

According to other aspects of the system provided herein, the server computer is further operative to render, in response to the request for the resource, an intermediary object for facilitating communication between client side objects executing on the client computer. The client computer may receive the intermediary object from the server computer and execute the intermediary object, such as within a script host executing in conjunction with a Web browser on the client computer.

According to yet other aspects of the system provided herein, a client side object may support a provider interface at runtime for providing data to other objects. If an event is detected within a client side object supporting a provider interface, the program code implementing the object interface is called in response to the event. Information regarding the event may then be passed to the intermediary object for provision to one or more consumer objects.

A client side object may also support a consumer interface at runtime for consuming and utilizing data generated by other objects. The program code implementing a consumer interface is operative to register with the intermediary object to receive event notifications for particular types of events. If such an event occurs, the program code implementing the interface receives the event notification and information provided in connection with the event and passes the event to the client side object supporting the consumer interface. It should be appreciated that a single client side object may support both consumer and provider interfaces for consuming data provided by other objects and providing data to other objects, respectively.

Other aspects of the invention relate to schema and data structures utilized for dynamically implementing an object interface at runtime. The invention may also be implemented as a computer process, a computing system, or as an article of manufacture such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

FIGS. 7A–7E illustrate an operational process performed by a client computer and a server computer for implementing object interfaces at runtime that permit inter-object communication according to one embodiment of the invention; and FIG. 8 shows a illustrative screen display including displays provided by several software components executing on a client computer and utilizing inter-object communication as provided by the various embodiments of the invention.

DETAILED DESCRIPTION OF THE INVENTION

Figure 1:
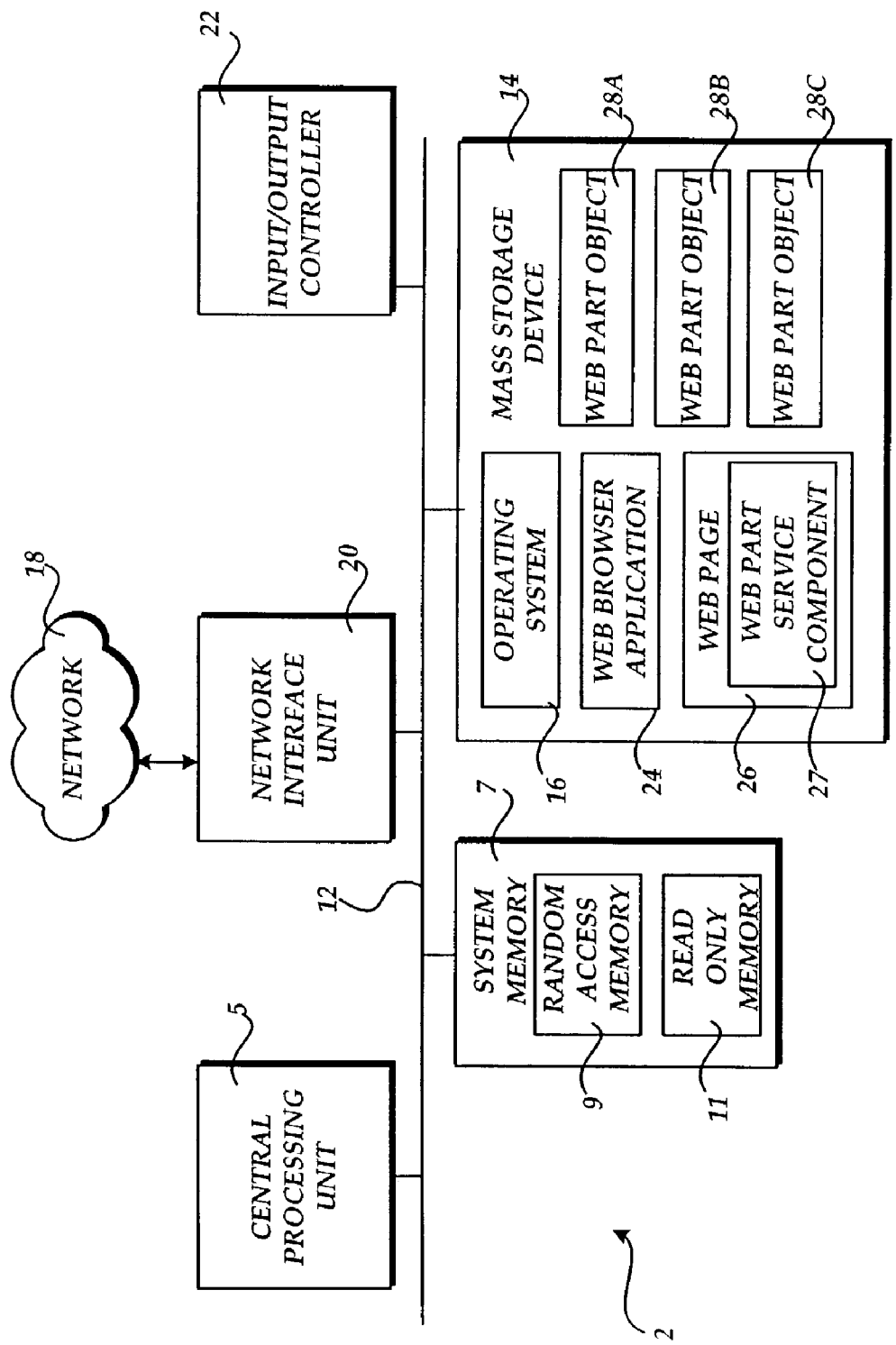
FIGS. 1 and 2 illustrate a computer architecture and various software components utilized by a client computer and a server computer, respectively, utilized in embodiments of the present invention.

Referring now to the drawings, in which like numerals represent like elements, a computer hardware and software architecture utilized by several computers provided in the various embodiments of the invention will be described. In particular, FIGS. 1 and 2 and the corresponding discussion are intended to provide a brief, general description of a suitable computing environment in which embodiments of the invention may be implemented. While the invention will be described in the general context of program modules that execute in conjunction with program modules that run on an operating system on a personal or server computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a client computer 2 utilized in the various embodiments of the invention will be described. The computer architecture shown in FIG. 1 illustrates a conventional desktop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The client computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media, provide non-volatile storage for the client computer 2. Although the description of computer-readable media contained herein refers to a mass storage device, such as a hard disk or CD-ROM drive, it should be appreciated by those skilled in the art that computer-readable media can be any available media that can be accessed by the client computer 2 or the server computer 30, described below.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the client computer 2 or the server computer 30, described below.

According to various embodiments of the invention, the client computer 2 may operate in a networked environment using logical connections to remote computers, such as the server computer 30, through a network 18, such as the Internet. The client computer 2 may connect to the network 18 through a network interface unit 20 connected to the bus 12. It should be appreciated that the network interface unit 20 may also be utilized to connect to other types of networks and remote computer systems. The client computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the client computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a Web browser application program 24 ("Web browser"). The Web browser 24 comprises an application program capable of requesting and rendering Web pages created in HTML or other types of markup languages, such as the Web page 26. An example of one such Web browser is the INTERNET EXPLORER Web browser from MICROSOFT CORPORATION or the NETSCAPE NAVIGATOR Web browser from NETSCAPE CORPORATION.

The Web browser 24 is also capable of executing scripts through the use of a scripting host. The scripting host executes program code expressed as scripts within the browser environment. For instance, INTERNET EXPLORER is capable of executing program code written in the JSCRIPT programming language from MICROSOFT CORPORATION. As known to those skilled in the art, JSCRIPT is a general-purpose object-based scripting language. Other Web browsers are capable of executing program code written in similar scripting languages in a similar fashion.

According to one embodiment of the invention, the Web browser 24 is operative to receive a Web page 26 that includes a WPSC 27. As described briefly above, the WPSC 27 is an intermediary object that mediates communication between client side objects executing in conjunction with the Web browser 24. More particularly, the WPSC 27, is utilized in conjunction with Web Part Page technologies from MICROSOFT CORPORATION. For example, the WINDOWS SHAREPOINT SERVICES ("WSS") and SHAREPOINT PORTAL SERVICES ("SPS") portal applications utilize the WPSC 27 for inter-object communication on the client computer 2. The WPSC 27 provides a standard framework for communication between client side objects, allows client side objects to discover one another, provides session state management, state management, and item retrieve facilities. The WPSC 27 is typically rendered in JSCRIPT as a hidden object present in each Web page 26. Additional details regarding the creation and utilization of the WPSC 27 will be provided below.

The Web browser 24 is also operative to execute one or more client side objects. As discussed briefly above, client side objects are executable objects that may be identified in a Web page 26 and executed in conjunction with the rendering of the Web page 26. For instance, JAVA applets or ACTIVEX controls may be identified on a Web page 26 and rendered by the Web browser 24 to generate a portion of the Web page 26 display.

According to one embodiment of the invention, the Web browser 24 is further operative to utilize client side objects called Web part objects 28A–28C (also referred to herein as "Web parts"). Web part objects 28A–28C are client side objects that stand alone and that are configured for use with the WPSC 27. Web parts 28A–28C are reusable components that contain Web-based content such as extensible markup language ("XML"), HTML, and scripts. Web parts 28A–28C have a set of standard properties that control how they are rendered. These properties make Web parts storage-neutral and completely reusable. Because Web parts adhere to a common standard, they may be stored in libraries that may be utilized to create a variety of Web pages 26. Web pages 26 that include Web part objects 28A–28C may be referred to herein as Web Part Pages. Additional details regarding the structure and use of the Web parts 28A–28C will be described in greater detail below.

According to one embodiment of the invention, the Web part objects 28A–28C are operative to provide spreadsheet functionality within a Web page 26. In particular, the Web part objects 28A–28C are operative to provide functionality similar to that provided by a desktop spreadsheet application program such as the EXCEL spreadsheet application from MICROSOFT CORPORATION. As will be described in greater detail below, embodiments of the invention dynamically implement object interfaces for the Web parts 28A–28C that permit inter-object communication. For instance, a provider interface may be dynamically implemented for one of the Web parts 28A at runtime that allows the Web part 28A to provide the contents of a selected spreadsheet row to another of the Web parts 28B–28C. A consumer interface may also be dynamically implemented at runtime that allows one of the Web parts 28B to consume and utilize data provided by another of the Web parts 28A. Additional details regarding the dynamic implementation of these interfaces is provided below.

Figure 2:
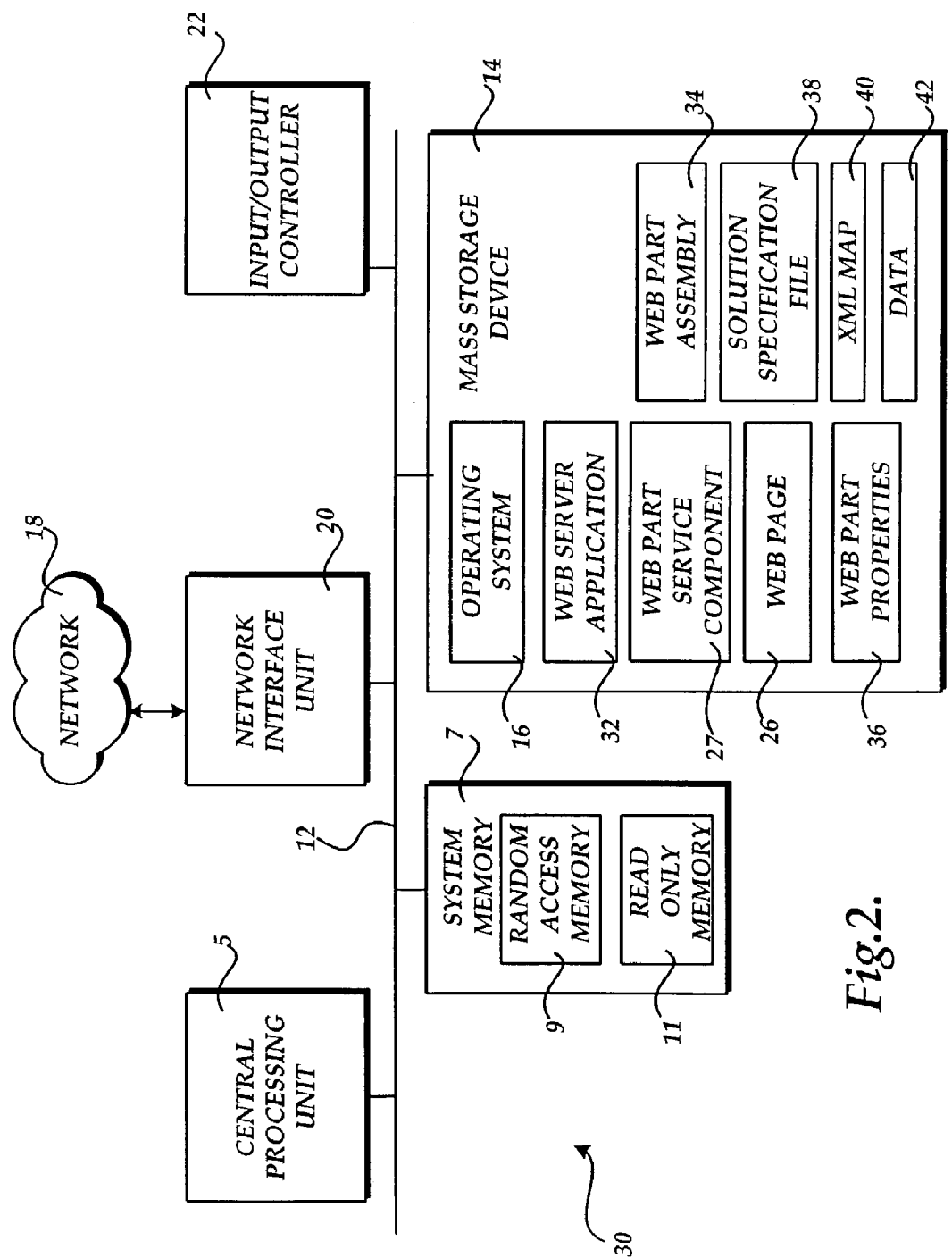

Referring now to FIG. 2, a server computer 30 utilized in the various embodiments of the invention will be described. As shown in FIG. 2, the server computer 30 includes many of the conventional computing components included in the client computer 2 and described above with respect to FIG. 1. In particular, the server computer 30 includes a CPU 5, a network interface unit 20 connected to a network 18, such as the Internet, a system memory 7 and a mass storage device 14. The mass storage device 14 utilized by the server computer 30 is operative to store an operating system 16 suitable for controlling the operation of a server computer. For instance, the operating system 16 may comprise the WINDOWS XP SERVER OPERATING SYSTEM from MICROSOFT CORPORATION.

The mass storage device 14 is also operative to store program modules for building and serving Web Part Sites. In particular, the mass storage device 14 may include the WSS or SPS portal applications from MICROSOFT CORPORATION. As a part of the WSS or SPS applications, the server computer 30 may utilize a Web server application 32. According to one embodiment of the invention, the Web server application 32 comprises the INTERNET INFORMATION SERVER application from MICROSOFT. It should be appreciated, however, that other types of Web server applications may be utilized.

The Web server application 32 receives and responds to requests from client computers, such as the client computer 2, for Web pages 26 located at or accessible to the server computer 30. It should be appreciated that Web pages as described herein include both pages stored statically, such as those utilizing only HTML, and those generated dynamically through the use of server side scripting technologies, such as ACTIVE SERVER PAGES configured for use within the .NET environment ("ASP.NET" or "ASPX") from MICROSOFT CORPORATION.

According to the various embodiments of the invention, the Web server application 32 may receive requests for Web pages 26 that include one or more Web parts 28A. As discussed above, Web parts 28A comprise client side objects that may be used by a Web browser when displaying a Web page 26. In conjunction with the provision of Web part objects 28, the Web server application 32 may render and serve a WPSC 27. The WPSC 27 may be rendered as a hidden object within the Web page 26 and provided to a client computer 2. Additional details regarding the rendering of the WPSC 27 and the Web page 26 will be provided in greater detail below.

The mass storage device 14 utilized on the server computer 30 may also store Web part properties 36 associated with the Web part object 28A. The Web part properties 36 may be set by a solutions developer and contain data regarding the operation of the Web part object 28A. According to one embodiment of the invention, the Web part properties 36 include the location of a solution specification file 38 on the mass storage device 14 or located elsewhere. As will be described in greater detail below, the solution specification file 38 includes data indicating whether one or more object interfaces should be implemented for the Web part object 28A at runtime. Moreover, if a runtime object interface is to be provided for the Web part object 28A, the solution specification file 38 defines the implementation of the object interface. The solution specification file 38 may also be utilized by a solution developer to specify the types of interfaces that should be implemented for the Web part object 28A at runtime.

The solution specification file 38 may also include a pointer to an XML map 40. The XML map 40, also called the XML spreadsheet file herein, is utilized by the Web part object 28A to locate a source of data 42 for processing or display. Additionally, the XML map 40 indicates to the Web part object 28A the manner in which the retrieved data should be displayed. As will be described in greater detail below, the XML map 40 is located by the Web server application 32 and rendered into the Web page 26 prior to transmission to a requesting client computer 2.

The mass storage device 14 is also operative to store a Web Part Assembly 34 ("WPA"). The WPA 34 executes on the server computer 30 in conjunction with the Web server application 32. The WPA 34 communicates with the Web part object 28A executing on the client computer 2. Together, the WPA 34 and the Web part object 28A can provide functionality for performing tasks both on the client computer 2 and on server computer 30. Additional details regarding the operation of the WPA 34 in conjunction with the Web part object 28A will be described in greater detail below.

Figure 3:
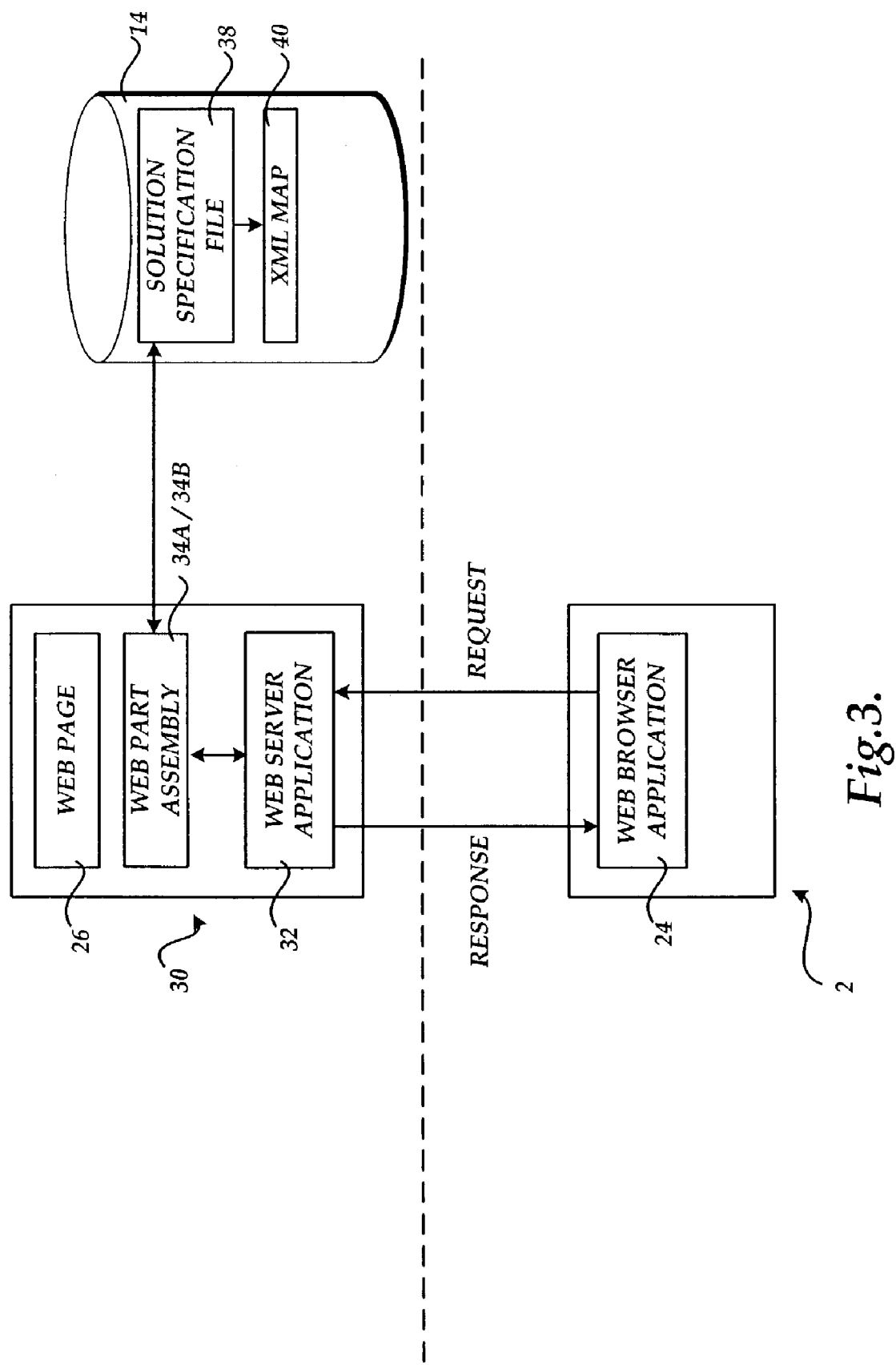
FIG. 3 shows aspects of the interaction between software components executing on a client computer and components executing on a server computer in one embodiment of the invention.

Turning now to FIG. 3, additional details regarding the systems and methods provided herein for dynamically implementing a runtime interface will be provided. As shown in FIG. 3, the Web browser application 24 may be utilized by a user to request a Web page 26 from the Web server application 32. In particular, the Web page 26 requested may include a reference to one or more assemblies 34 which, in turn, reference the appropriate Web part objects 28A. In the examples described herein, the Web page 26 includes a reference to a Web part assembly 34A which, in turn, references the Web part object 28A that provides data to other Web parts and a reference to a Web part assembly 34B that references a Web part object 28B that consumes data from other objects. It should be appreciated that while each of the Web part objects described herein is described as either consuming or providing data, each Web part may both consume and provide data.

When a request is received at the Web server application 32 for the Web page 26, the Web server application 32 recognizes that the Web page 26 includes a reference to a Web part assembly 34. Accordingly, the Web server application 32 passes the request to the WPA 34. The WPA 34 then determines, based on the Web part properties 36, the location of a solution specification file 38 associated with the Web part object 28A. As described above, the solution specification file includes a pointer to an XML map 40. The XML map 40 is utilized by the Web part object 28A when executing on the client computer 2 to locate, retrieve, and format data.

Once the WPA 34 has located the solution specification file 38 and the XML map 40, the contents of these two files are utilized by the Web server application 32 to render a portion of the contents of the Web page 26. Additional details regarding the contents of the Web page 26 generated by the Web server application 32 will be described below with respect to FIG. 4.

Once the Web server application 23 has completed rendering the Web page 26, the Web page 26 is transmitted to the Web browser 24 in response to the original request. Additional details regarding the functionality performed at the client computer 2 following the receipt of a Web page 26 that includes Web part objects 28A–28B will be described below with respect to FIG. 5.

Figure 4:
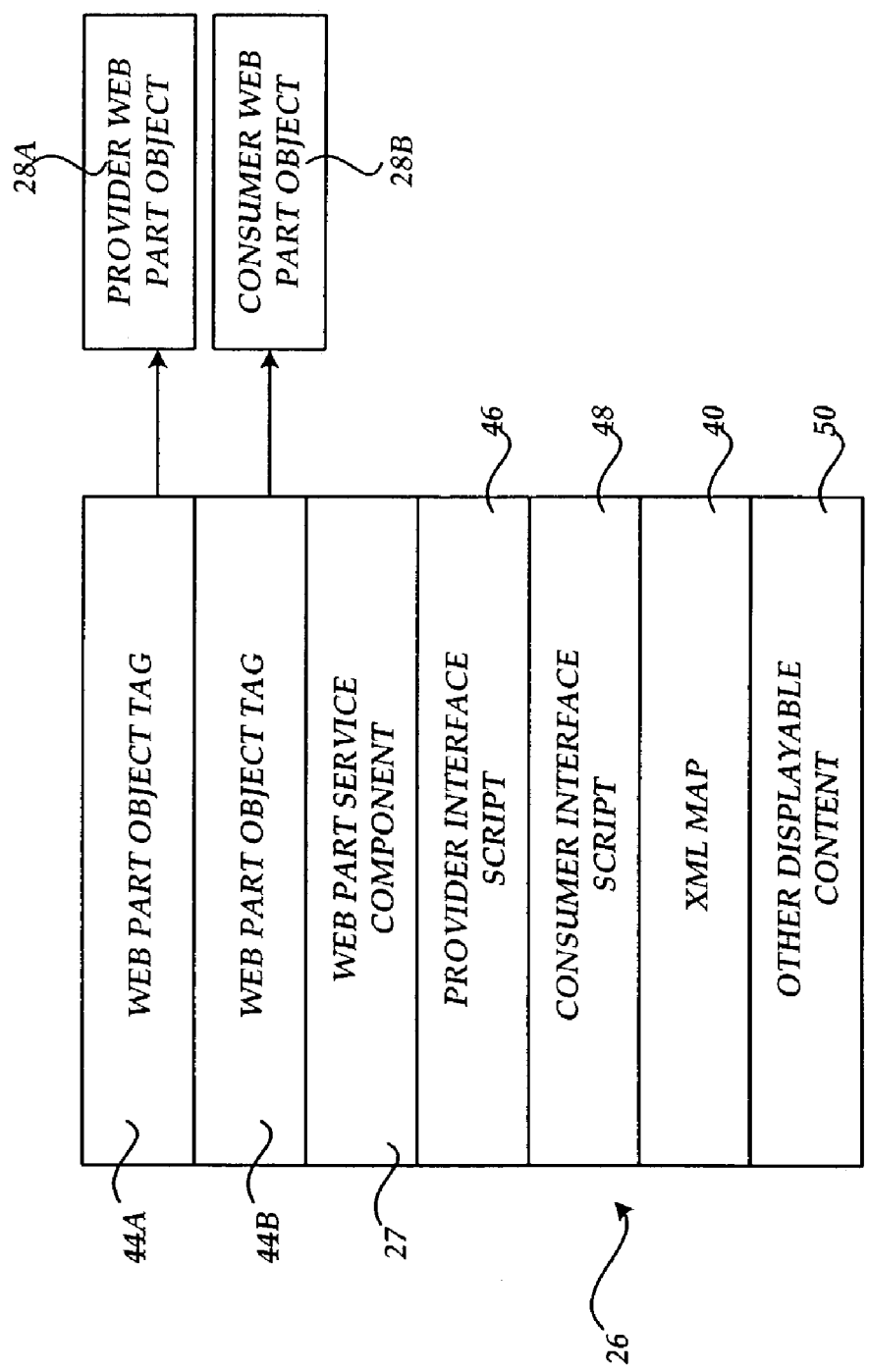
FIG. 4 shows the contents of a Web page generated by a server computer and utilized in one embodiment of the present invention.

Referring now to FIG. 4, an illustrative Web page 26 rendered by the Web server application 32 in response to a request from the client computer 2 for a Web page 26 will be described. As discussed above, Web page 26 includes references to the Web part objects 28A–28B. Accordingly, the Web server application 32 renders object tags 44A–44B into the Web page 26. The object tags 44A–44B direct the Web browser application 24 to an instance of the Web part objects 28A–28B. By executing the object tags 44A–44B, the Web browser application 24 can instantiate the Web part objects 28A–28B.

In addition to the object tags 44A–44B, the Web server application 32 also renders into the Web page 26 the WPSC 27. As described briefly above, the WPSC 27 is rendered as a hidden object in the Web page 26. The WPSC 27 acts as an intermediary between the Web part objects 28A–28B rendered on the page and allows, among other things, inter-object communication. Additional details regarding the operation of the WPSC 27 will be provided below.

As discussed above with respect to FIG. 3, the WPA 34 retrieves the solution specification file 38 prior to rendering the Web page 26. The WPA 34 also determines, based on the contents of the solution specification file 38, whether one or more object interfaces should be implemented for each of the Web part objects 28A–28B referenced in the Web page 26. If the solution specification file 38 indicates that an interface should be rendered for any of the Web part objects 28A–28B referenced on the Web page 26, scripts are rendered into the Web page 26 for implementing these interfaces. For example, as shown in FIG. 4, the Web part object 28A requires a provider interface so that it can provide data to other Web parts. Accordingly, a provider interface script 46 is rendered into the Web page 26. Table 1, below, illustrates a script for rendering a provider interface for providing data contained in rows of a spreadsheet.

TABLE 1

```
<SCRIPT LANGUAGE='JavaScript'>
<!--
if (document.all.SpreadsheetWPQ2.object != null)
{
var listObjectRowProvider1WPQ2WPQ2 = null;
var strMapEntryIDRowProvider1WPQ2WPQ2 = null;
try{
listObjectRowProvider1WPQ2WPQ2 =
document.all.SpreadsheetWPQ2.ActiveWorkbook.ListObject("1");
strMapEntryIDRowProvider1WPQ2WPQ2 = "1";
}catch(e) { }
if ((null != listObjectRowProvider1WPQ2WPQ2) && (null !=
strMapEntryIDRowProvider1WPQ2WPQ2)){
var fieldNamesRowProvider1WPQ2WPQ2 =
listObjectRowProvider1WPQ2WPQ2.PropNames.toArray( );
var fieldNamesValidRowProvider1WPQ2WPQ2 =
Spreadsheet_ValidatePropNames(fieldNamesRowProvider1WPQ2WPQ2
);
if (true == fieldNamesValidRowProvider1WPQ2WPQ2) {
var interfaceNameRowProvider1WPQ2WPQ2 = "RowProvider1WPQ2";
```

TABLE 1-continued

```
var RowProvider1WPQ2WPQ2 = new
SpreadsheetRowProvider(strMapEntryIDRowProvider1WPQ2WPQ2,
fieldNamesRowProvider1WPQ2WPQ2,
interfaceNameRowProvider1WPQ2WPQ2);
} else {alert("There is an error with the RowProvider connection interface
of the Suppliers Web Part. Check for invalid values in the Web Part's
Solution Specification file or XML Spreadsheet file.");}
} else {alert("The <MapEntryID> for a RowProvider interface on the
Suppliers Web Part is invalid.");}
var propertiesSpreadsheetToPivotChartWPQ2WPQ2= new Array(3);
}
//-->
</SCRIPT>
```

The Web part object 28B requires a consumer interface for receiving data from other Web parts. Accordingly, a consumer interface script 48 is rendered into the Web page 26 for implementing an interface for the Web part object 28B. Table 2, below, illustrates a script for providing a consumer interface for receiving data contained in rows of a spreadsheet provided through the provider interface described above. Additional details regarding the operation of the provider interface script 46 and the consumer interface script 48 will be described below with reference to FIG. 6.

TABLE 2

```
<SCRIPT LANGUAGE='JavaScript'>
<!--
if (document.all.SpreadsheetWPQ3.object != null)
{
var inFieldsRowConsumerProdWPQ3WPQ3 = new Array(1);
var bindingsRowConsumerProdWPQ3WPQ3 = new Array(1);
var paramIdsRowConsumerProdWPQ3WPQ3 = new Array(1);
inFieldsRowConsumerProdWPQ3WPQ3[0] = "SupplierID";
bindingsRowConsumerProdWPQ3WPQ3[0] = "Binding1";
paramIdsRowConsumerProdWPQ3WPQ3[0] = "Supplier";
var RowConsumerProdWPQ3WPQ3 = new
SpreadsheetRowConsumerDSP(document.all.SpreadsheetWPQ3,
inFieldsRowConsumerProdWPQ3WPQ3,
bindingsRowConsumerProdWPQ3WPQ3,
paramIdsRowConsumerProdWPQ3WPQ3);
}
//-->
</SCRIPT>
```

As briefly discussed above, the solution specification file 38 includes a pointer to the XML map 40. The XML map 40 includes data for each of the Web parts 28A–28B that identify the location of a source of data to be utilized by the Web parts. Moreover, the XML map 40 specifies to the Web parts 28A–28B how the retrieved data should be formatted and displayed. Accordingly, the Web server application 32 renders into the Web page 26 the contents of the XML map 40. Additional details regarding the use of the XML map 40 by the Web part objects 28A–28B will be described below with respect to FIG. 5.

The Web server application 32 may also render into the Web page 26 other displayable content 50. This may include HTML, XML, references to non-Web part client side objects, and other types of content that may be utilized by the Web browser application 24 to display the Web page 26.

Figure 5:
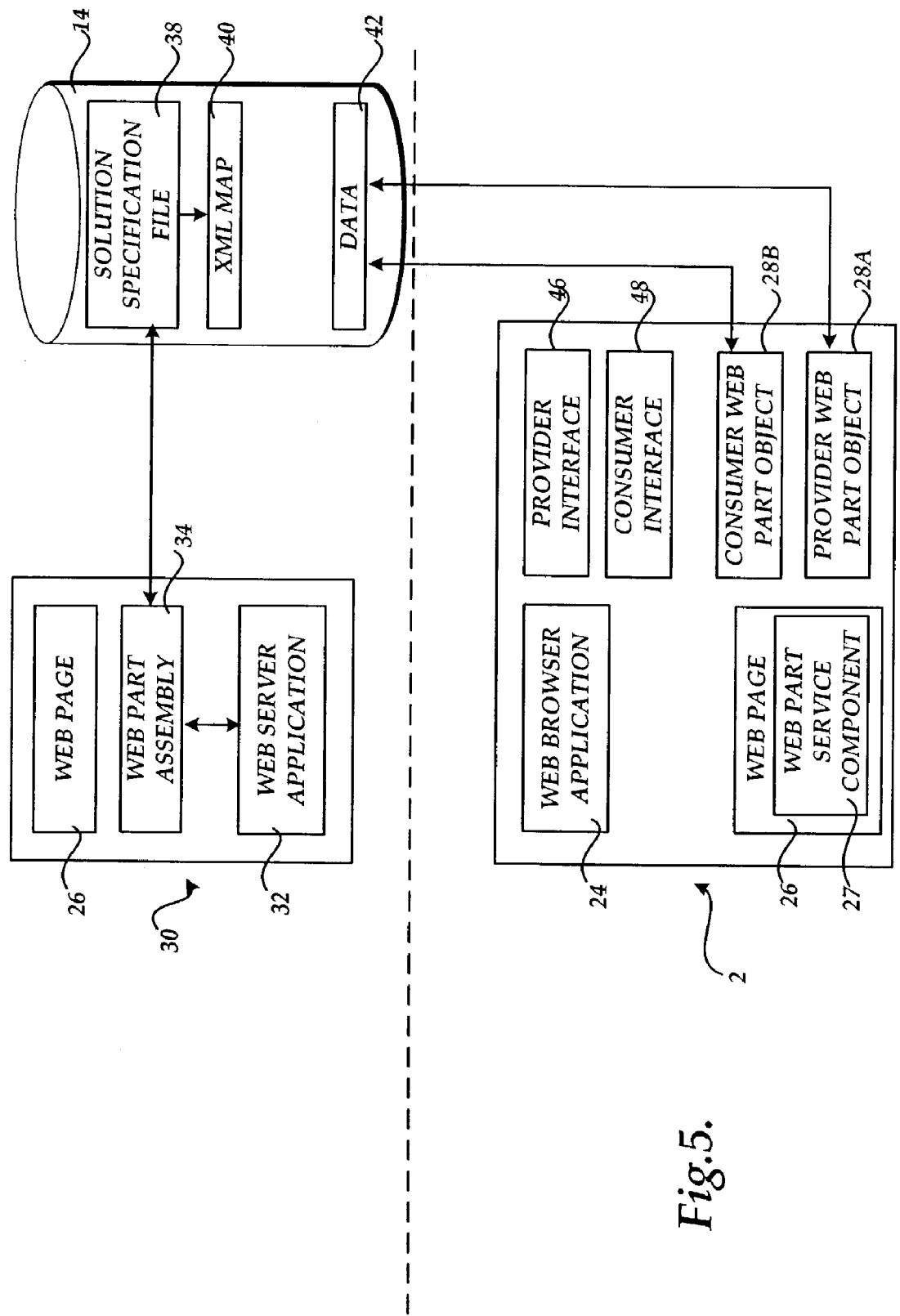
FIG. 5 shows additional aspects regarding the interaction between software components executing on a client computer and components executing on a server computer in one embodiment of the invention.

Turning now to FIG. 5, additional details regarding the display and functionality provided by of the Web page 26 on the client computer 2 will be described. As described above, the Web browser application includes a script host for executing scripts. Accordingly, when the Web browser application 24 receives the WPSC 27, the provider interface 46, and the consumer interface 48, these scripts are executed. Additionally, when the Web browser application 24 renders the Web page 26, the object tags 44A–44B cause the provider Web part object 28A and the consumer Web part object 28B to be instantiated by the Web browser 24.

When the Web part objects 28A–28B are instantiated, these objects utilize the contents of the XML map 40 to locate a source of data 42. Once the data 42 has been located by the Web part objects 28A–28B, the data may be retrieved and displayed. It should be appreciated that although the data 42 is illustrated as being stored at the server computer 30, this data may be stored at any location on a distributed computing network. As also described above, the Web part objects 28A–28B also utilize the XML map 40 to properly display the retrieved data 42. For example, as described above, the Web part objects 28A–28B may provide functionality for implementing spreadsheet functions within a Web page 26.

As shown in FIG. 8, the data 42 may comprise spreadsheet tables 62A and 62B to be displayed by the Web part objects 28A–28B, respectively. The XML map 40 identifies to the Web part objects 28A and 28B how these tables should be rendered within the Web page 60. As described in greater detail below, a provider interface 46 is provided that allows the table 62A to provide data to another Web part object. Similarly, a consumer interface 48 is also provided that allows the table 62B to consume and utilize data provided by another Web part. For instance, spreadsheet row data may be provided from the table 62A to the table 62B. The row data may then be utilized to sort the table 62B. Additional details regarding this process are described below.

Figure 6:
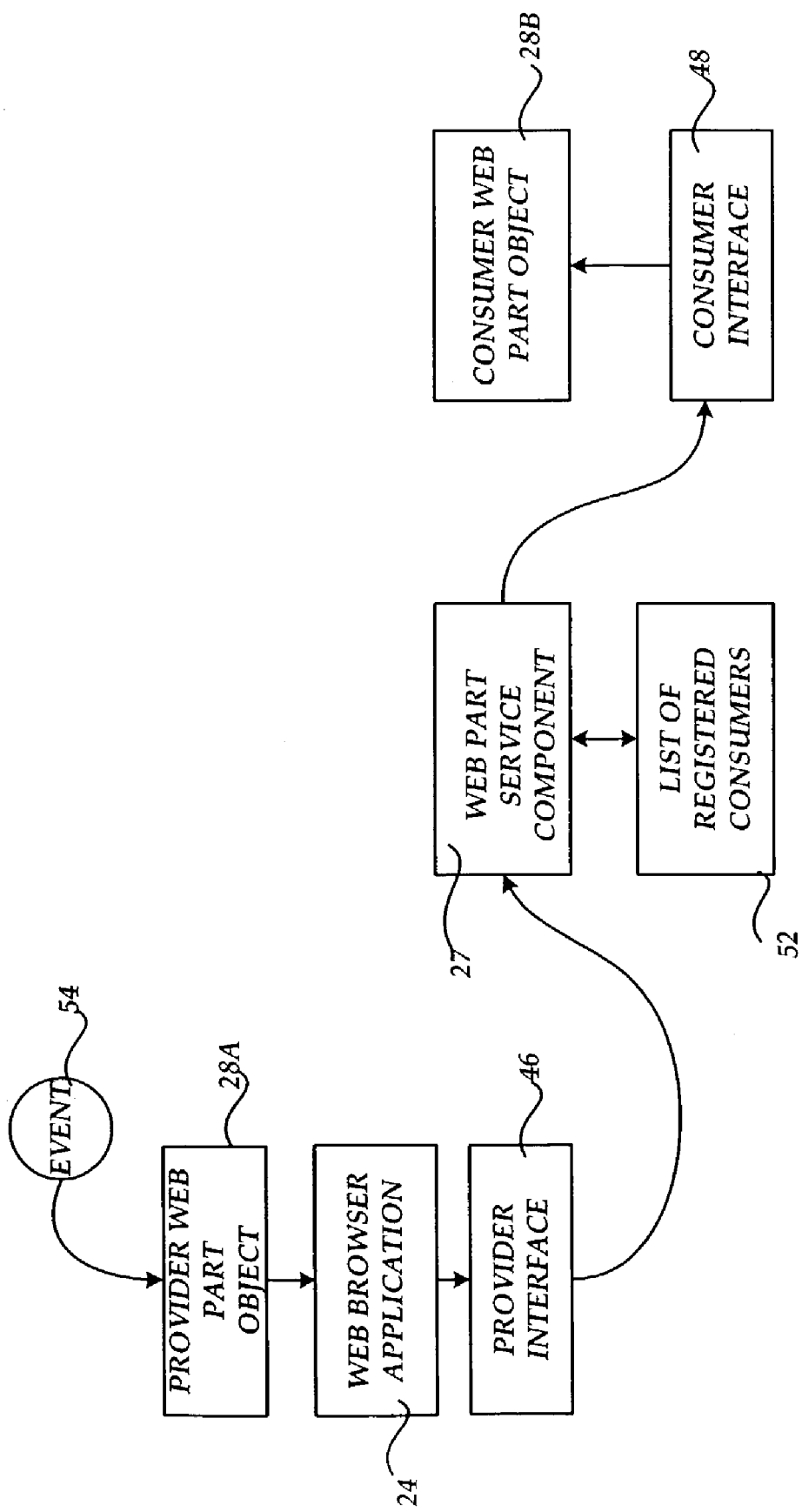
FIG. 6 illustrates the operation of various software components executing within a client computer and operative to implement an object at runtime for inter-object communication in one embodiment of the invention.
Figure 7A:
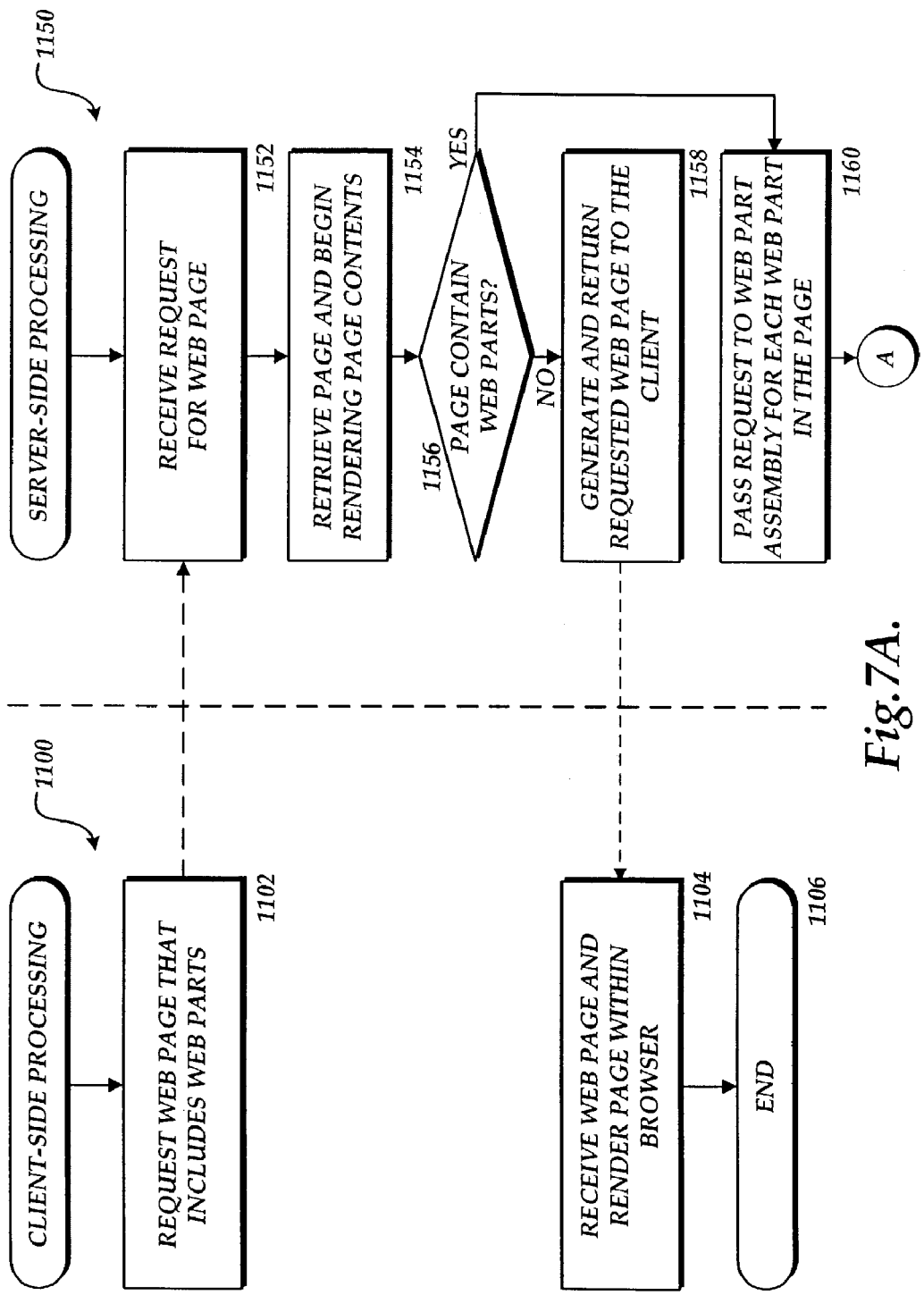
Figure 7B:
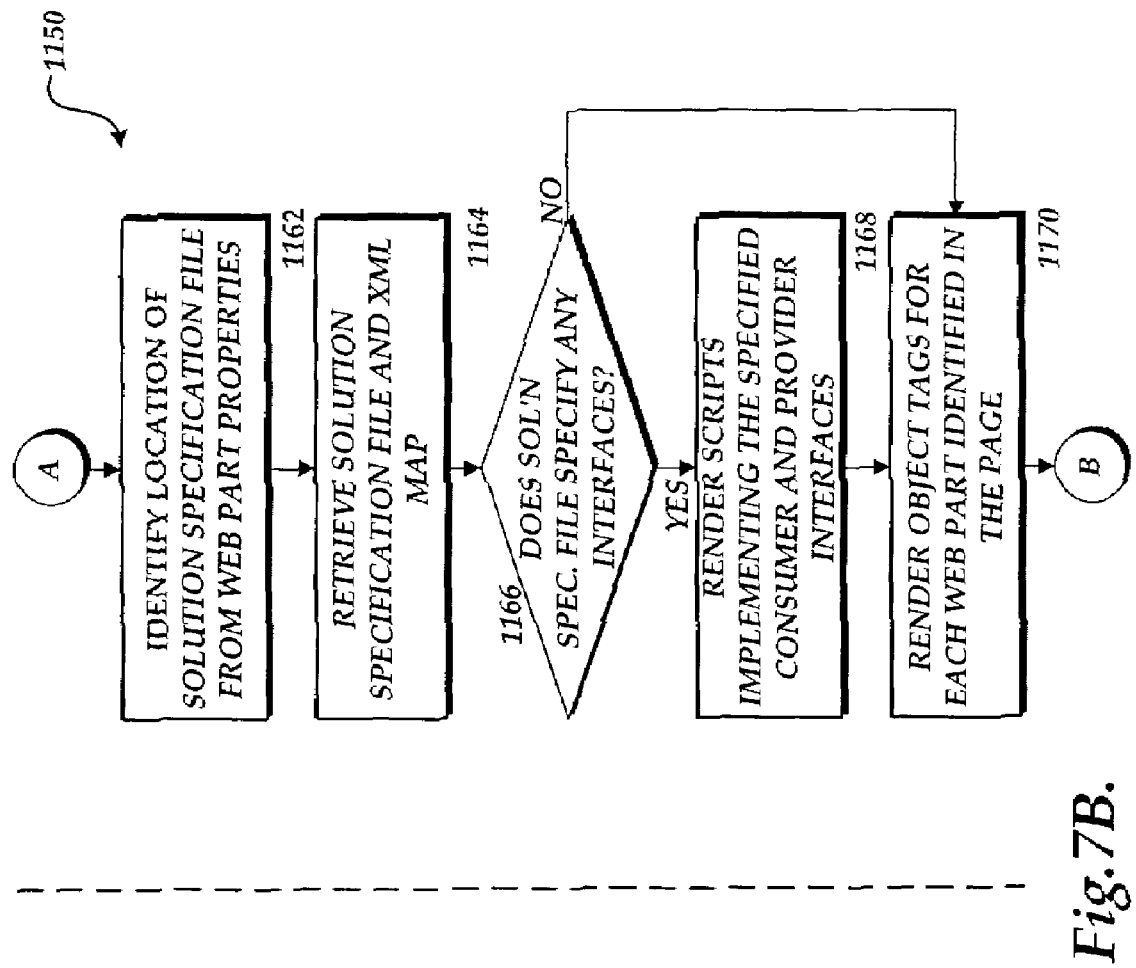
Figure 7C:
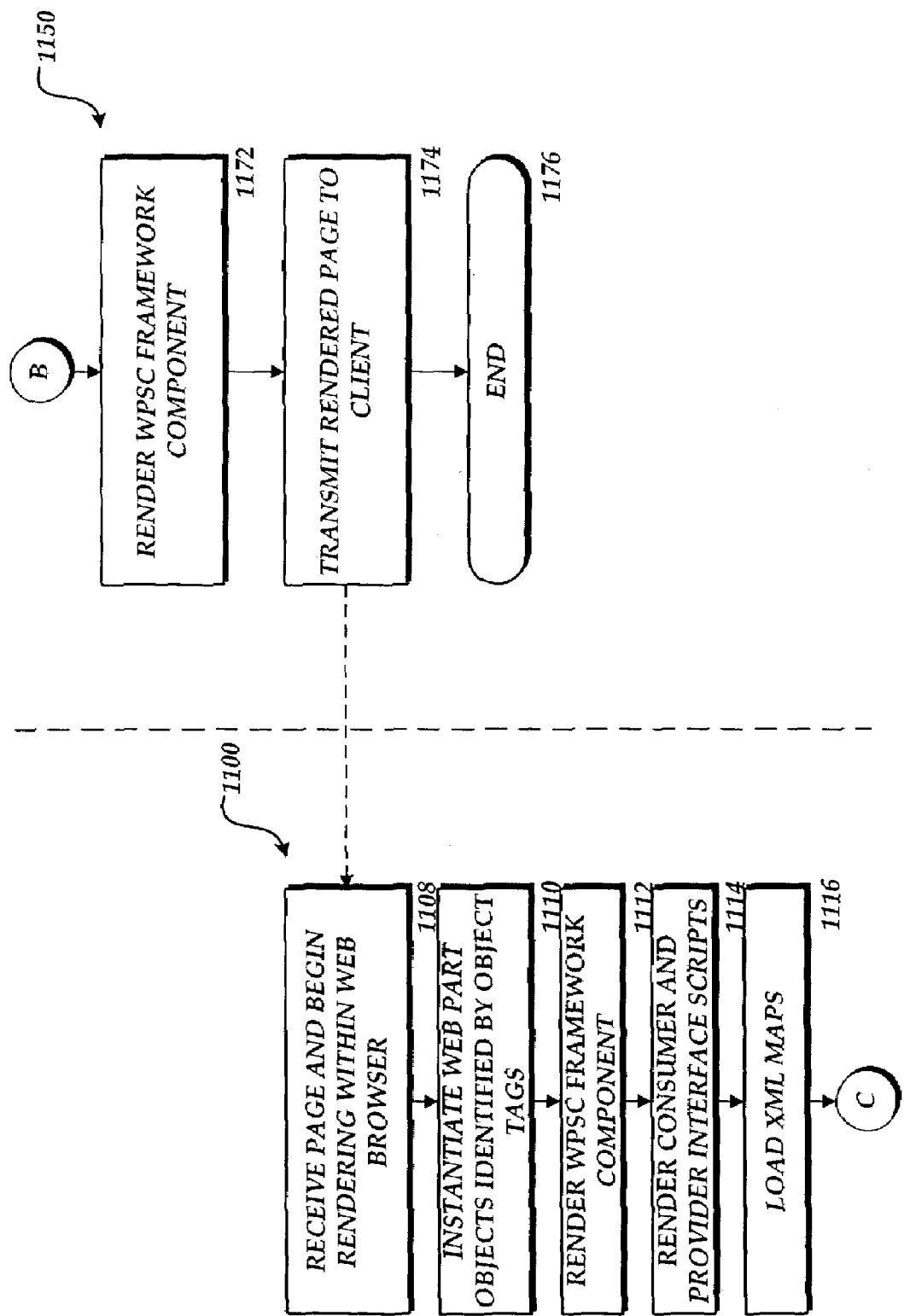
Figure 7D:
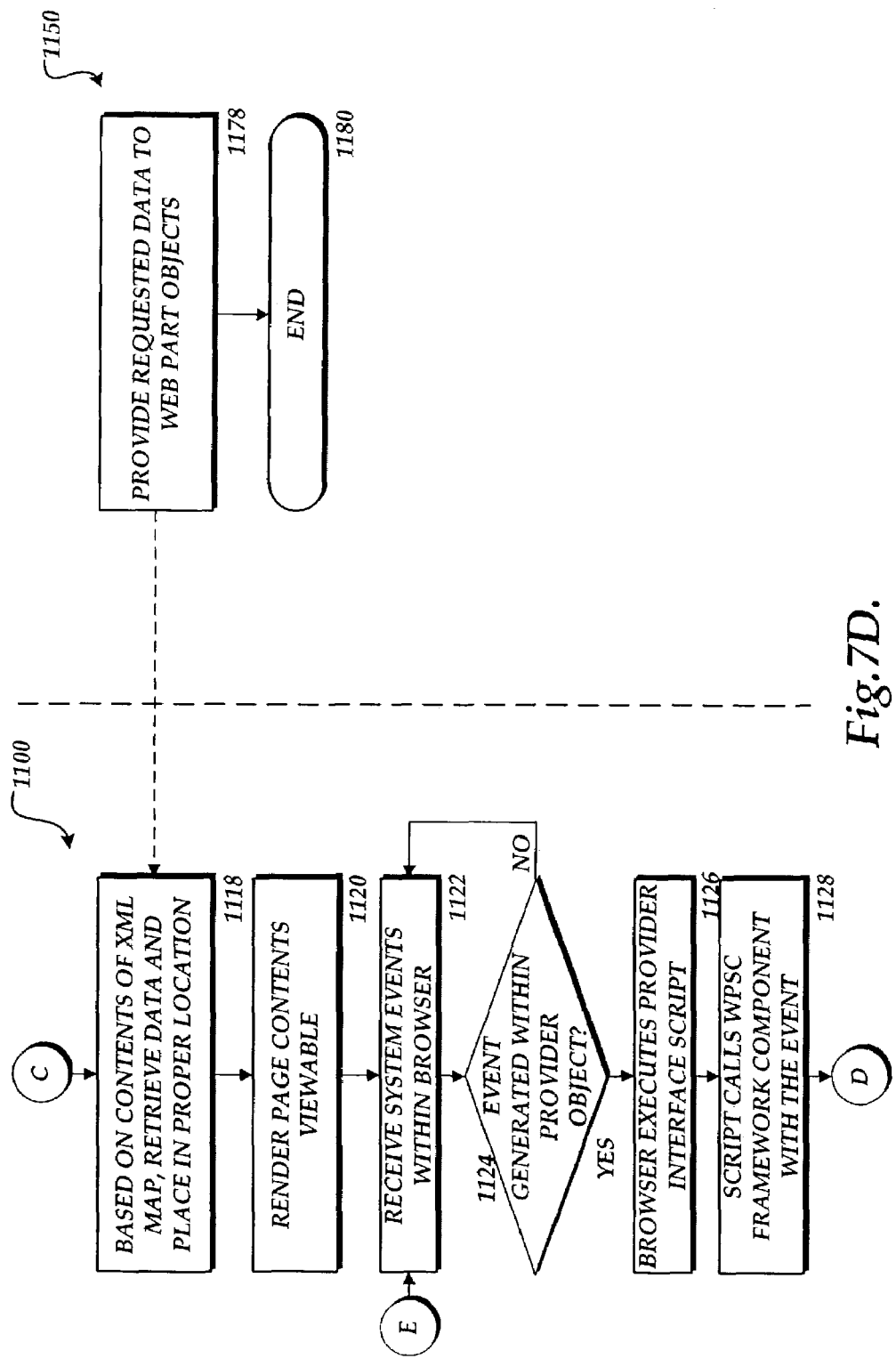

Referring now to FIG. 6, additional details regarding the operation of the provider interface 46 and the consumer interface 48 will be described. As discussed briefly above, the interfaces 46 and 48 are rendered by the Web server application 32 and transmitted to the Web browser application 24 as a component of the Web page 26. The interfaces 46 and 48 are then executed within the scripting host of the Web browser application 24. As discussed above, the provider interface 46 provides an interface between the provider Web part object 28 and the WPSC 27. Similarly, the consumer interface 48 provides an interface between the consumer Web part object 28B and the WPSC 27.

FIG. 6 illustrates the operation of both the provider interface 46 and the consumer interface 48. As shown in FIG. 6, an event 54 may be generated that is directed to the display provided by the provider Web part object 28A. For instance, a user may select a row in a spreadsheet provided by the Web part object 28A. This event is handled by the Web browser application 24. In particular, the Web browser application 24 identifies the provider interface 46 as a listener for the generated type of event. As a result, the Web browser application 24 calls a provider interface 46 with the event.

The provider interface 46 catches the event generated by the provider Web part object 28A and converts the event into a format compatible with the framework provided by the WPSC 27. The provider interface 46 also calls the WPSC 27 with the event. For instance, in the example described above wherein a user selects a row within a spreadsheet provided by the Web part object 28A, the provider interface 46 may call the WPSC 27 with the contents of the selected row.

In order to pass events to the consumer Web part object 28B, the consumer object interface 48 must register with the WPSC 27 as a consumer of certain event types. When an event is received at the WPSC 27, such as that generated by the provider interface 46, the WPSC 27 identifies the consumer Web part object 28B from a list of registered consumers 52. As a result, if the consumer interface 48 has registered the Web part object 28B as a consumer of the type of data provided by the provider interface 46, the WPSC 27 will call the consumer interface 48 when that type of event is generated, provided the page designer explicitly connected the provider interface to the consumer interface. For instance, the consumer interface 48 may be registered with the WPSC 27 as a consumer of spreadsheet row data. When, as described above, a row is selected within the spreadsheet provided by the Web part object 28A, and the provider interface 46 passes the spreadsheet row to the WPSC 27, this data will be transmitted to the consumer interface 48 if that specific consumer interface was connected to the specific provider interface. In turn, the data will be transmitted to the consumer Web part object 28B. A consumer Web part object 28B may then take action as specified by the consumer interface 48 on the received data. It should be noted that if there is a provider interface 46, and a consumer interface 48 on a page but they have not been connected by the page designer, then data will not be transmitted to the consumer interface 48 and in turn the consumer Web part object 28B.

As described briefly above, the solution specification file 38 includes data that indicates whether an object interface should be created for each of the Web parts referenced within a Web page and may include one or more parameters for each object interface that define the implementation of the object interface. This data is utilized by the Web server application 32 to actually render the interfaces for each of the reference objects.

As also discussed briefly above, the interfaces may comprise either a consumer or a provider interface. Tables 3–8, below, illustrate XML that may be included in the solution specification file 38 for defining consumer interfaces. Tables 9 and 10 illustrate XML that may included in the solution specification file 38 for defining provider interfaces.

Table 3, below, illustrates a row consumer interface for receiving row information from another spreadsheet Web part and for performing actions based on that data. As shown in Table 3, this particular implementation of the row consumer interface includes an execute query tag that contains all the necessary information to connect an instance of the interface to a data query. In particular, the execute query tag includes a DSPCLIENTPARAMETER tag that contains a pairing of fields and values received via the interface in a particular data binding and parameters in the data query. This data can be utilized by the consumer Web part object 28B to perform a query based on the data contained in the received row.

TABLE 3

<RowConsumer Name="xxx_WPQ_" MenuLabel="yyyy" Description="zzzz">$_{0...Unbounded}$
   <ExecuteQuery>$_{0...1}$
      <DSPClientParameter>$_{1...Unbounded}$
   <P2PField>$_{1...1}$</P2PField>
         <BindingID>$_{1...1}$</BindingID>
         <ClientParameterName>$_{1...1}$</ClientParameterName>
      </DSPClientParameter>
   </ExecuteQuery>
</RowConsumer>

As shown in Table 4, a row consumer interface may be defined that can utilize the received information to sort a table in a spreadsheet. The interface described by the XML shown in Table 4 includes parameters for identifying a specific table, identifying the fields within the table that should be sorted, identifying the value that should be used to key the sort, and for specifying the direction of the sort. Utilizing this information, the consumer Web part object 28B can sort a spreadsheet table based on a value provided by another Web part object.

TABLE 4

```
<RowConsumer Name="xxx_WPQ_" MenuLabel="yyyy"
Description="zzzz">
    <LocalSort>$_{0...1}$
        <MapEntryID>$_{1...1}$</MapEntryID>
        <P2PField>$_{1...1}$</P2PField>
        <SortMapping>$_{1...unbounded}$
            <FieldID>$_{1...1}$</FieldID>
            <P2PFieldValue>$_{1...1}$</P2PFieldValue>
        </SortMapping>
        <SortDirection>$_{1...1}$</SortDirection>
    </LocalSort>
</RowConsumer>
```

The XML shown in Table 5 provides tags for implementing a consumer interface on a Web part object 28B that executes a script. In particular, the XML shown in Table 5 includes tags that connect an instance of a consumer interface to a custom script function. The tags include data containing the script of the function to be called, the name of a function to be called, and the name of a field in a row or cell received through the interface that should be utilized by the script. In this manner, a Web part object 28B can call a custom script utilizing the contents of information provided from another Web part object 28A.

TABLE 5

```
<RowConsumer Name="xxx_WPQ_" MenuLabel="yyyy"
Description="zzzz">
    <RunScript>$_{0...1}$
        <Script>$_{01...0}$</Script>
        <FunctionName>$_{1...1}$</FunctionName>
        <P2PField>$_{1...Unbounded}$</P2PField>
    </RunScript>
</RowConsumer>
```

The XML shown in Table 6 includes tags for binding a specific instance of the consumer interface to a part-to-part binding. In particular, the tags reference the particular binding identification number to be used in the part-to-part binding. The binding corresponds to a binding identification number contained in the spreadsheet utilized by the Web part object 28B. Moreover, the values received from the provider Web part are displayed in the spreadsheet according to the layout defined in the XML map 40.

TABLE 6

```
<RowConsumer Name="xxx_WPQ_" MenuLabel="yyyy"
Description="zzzz">
    <P2PBinding>$_{0...1}$
        <BindingID>$_{1...1}$<BindingID>
    </P2PBinding>
</RowConsumer>
```

The XML shown below in Table 7 is used to generate a filter consumer interface. The elements contained in the filter consumer interface define how the data contained in the spreadsheet table utilized by the consumer Web part object 28B should be filtered based on data received from another Web part object 28A. In this manner, the consumer Web part object 28B can filter the contents of the spreadsheet utilizing data provided through the provider interface 46.

TABLE 7

```
<FilterConsumer  Name="xxx_WPQ_"  MaxConnections="-1"
MenuLabel="yyyy" Description="zzzz">$_{0...unbounded}$
    <LocalFilter>$_{1...1}$
        <MapEntryID>$_{1...1}$</MapEntryID>
    </LocalFilter>
</FilterConsumer>
```

The XML shown in Table 8 defines an interface on a consumer Web part object 28B for consuming parameters generated by the provider interface 46. In particular, the XML shown in Table 8 includes tags that identify a script, function, and parameter, that may be called when certain parameters are received through the consumer interface 48.

TABLE 8

```
<ParametersOutConsumer Name="xxx_WPQ_" MaxConnections="1"
MenuLabel="yyyy" Description="zzzz">$_{0...unbounded}$
    <RunScript>$_{1...1}$
        <Script>$_{0...1}$</Script>
        <FunctionName>$_{1...1}$</FunctionName>
        <ParameterName>$_{1...Unbounded}$</ParameterName>
    </RunScript>
</ParametersOutConsumer>
```

The XML shown in Table 9 defines a provider interface 46. In particular, the XML shown in Table 9 defines a row provider interface on the provider Web part object 28A. As discussed above, the row provider interface allows the provider Web part object 28A to provide rows of a spreadsheet to the WPSC 27 in response to the occurrence of certain types of events such as selection of a particular row. For instance, the map entry identification tag refers to a specific table to be connected to the interface. Any row selected in the table will be provided to the WPSC 27 via the interface. In this manner, the provider Web part object 28A can provide spreadsheet rows for utilization by other Web part objects, such as the consumer Web part object 28B.

TABLE 9

```
<RowProvider  Name="xxx_WPQ_"  MaxConnections="-1"
MenuLabel="yyyy" Description="zzzz">$_{0...unbounded}$
    <SendRow>$_{1...1}$
        <MapEntryID>$_{1...1}$</MapEntryID>
    </SendRow>
</RowProvider>
```

The XML shown in Table 10 is also a provider interface. The XML shown in Table 10 defines a parameter out provider interface for providing parameters to the WPSC 27 from a provider Web part object 28A. In particular, the XML tags shown in Table 10 allow a solution provider to define parameter name and value pairs that are transmitted from the Web part object 28A through the provider interface 46 to the WPSC 27.

TABLE 10

```
<ParametersOutProvider Name="xxx_WPQ_" MaxConnections="1"
MenuLabel="yyyy" Description="zzzz">$_{0...unbounded}$
    <SendParameters>$_{1...1}$
        <Parameter>$_{1...unbounded}$
            <ParameterName>$_{1...1}$</ParameterName>
            <DefaultValue>$_{0...1}$</DefaultValue>
            <Description>$_{1...1}$</Description>
        </Parameter>
    </SendParameters>
</ParametersOutProvider>
```

The logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as received within the claims attached hereto.

Referring now to FIGS. 7A–7E, the process steps performed by the server computer 30 and the client computer 2 to provide a runtime object interface will be described. In particular, the operation of the client computer 2 will be described with reference to the routine 1100 and the operation of the server computer 30 will be described with respect to the routine 1150. The routines 1100 and 1150 will be described together to illustrate the operations performed by both the client computer 2 and the server computer 3 in conjunction with one another.

The routine 1100 begins at block 1102, where the client computer 2 requests a Web page 26 from the server computer 30. The server computer 30 receives the request from the client computer 2 at block 1152. From block 1152, the routine 1150 continues to block 1154, where the requested Web page 26 is retrieved. Once the requested Web page has been retrieved, the Web server application 32 begins rendering the various components of the Web page 26. As described briefly above, the Web page 26 may comprise an ASP.Net page or other type of server-side technology whereby the Web server application 32 renders the page in response to a request from a client computer.

At block 1156, the Web server application 32 determines whether the Web page 26 includes one or more Web part objects 28. If the Web page 26 does not include Web part objects, the routine 1150 continues to block 1158 where the requested Web page is generated and returned to the Web browser application 24 executing on the client computer 2. The client computer 2 receives the Web page at block 1104 and renders the page displayable within the Web browser 24. From block 1104, the routine 1100 continues to block 1106, where it ends.

If, at block 1156, it is determined that the Web page 26 includes a reference to one or more Web part objects 28, the routine 1150 branches from block 1156 to block 1160. At block 1160, the Web server application 32 passes the request for the Web part object 28 to the WPA 34. It should be appreciated that each Web part object 28 has an associated WPA 34. Each request contained in the Web page 26 for a Web part object 28 is passed to the WPA 34 associated with the requested Web part object 28.

From block 1160, the routine 1150 continues to block 1162, where the WPA 34 identifies the location of the solution specification file 38 from the Web part properties 36 associated with the requested Web part object 28. As discussed above, the solution specification file 38 contains data indicating whether an object interface should be provided for the requested Web part object, parameters that define the interface, and a pointer to an XML map 40. As also discussed above, the XML map 40 identifies to the requested Web part object 28 the location of data 42 to be utilized by the Web part object 28, and also describes the format in which this data should be presented. Accordingly, the WPA 34 retrieves the solution specification file 38 and the XML map 40 at block 1164.

At block 1166, the WPA 34 determines whether the solution specification file 38 contains data indicating that an object interface should be provided for the requested Web part object 28. If the solution specification file 38 does indicate that one or more object interfaces should be provided for the Web part object, the routine 1150 continues to block 1168. At block 1168, the Web server application 32 renders either a provider interface script 46, a consumer interface script 48, or both, into the requested Web page 26. The rendered scripts are identified and constructed based on the contents of the solution specification file 38 described above with reference to FIG. 6. From block 1168, the routine 1150 continues to block 1170.

If, at block 1166, the WPA 34 determines that no object interfaces should be provided for the Web part object 28A, the routine branches from block 1166 to block 1170. At block 1170, the Web server application 32 renders the Web part object tags 44A–44B for each Web part object 28 identified within the Web page 26. The routine 1150 then continues to block 1170, where the Web server application 32 renders the WPSC 27, the XML map 40, and any other displayable content 50 into the Web page 26. In this manner, the Web page is constructed as described above with reference to FIG. 4. The routine 1150 then continues to block 1174, where the Web page 26 is transmitted to the client computer 2.

It should be appreciated that the Web page 26 may be rendered all at once or may be rendered in a stream of data that is continuously transmitted from the server computer 30 to the Web browser application 24. The routine 1150 continues from block 1174 to block 1176, where it ends.

At block 1108, the Web browser application 24 receives the Web page 26 and begins rendering the Web page within the browser environment. In particular, displayable content is rendered displayable and script content is rendered within the scripting host portion of the Web browser application 24. In particular, at block 1110, the Web part objects 28A–28B referenced within the Web page 26 are instantiated on the client computer 2. The WPSC 27, the provider interface script 46, and the consumer interface script 48 are rendered within the scripting host of the Web browser application 24 at blocks 1112 and 1114, respectively.

At block 1116, the instantiated Web part objects 28A–28B load their respective XML maps 40. Based upon the contents of the XML maps 40, the Web part objects 28 retrieve data 42 from the server computer 30 or from another network location. The server computer 30 provides the requested data to the Web part objects 28 at block 1178.

Once the Web part objects 28 have retrieved the data 42, this data is displayed in the manner set forth in the XML map 40. For instance, the XML map 40 may include data identifying where and how a spreadsheet table should be displayed by the Web part object 28. Accordingly, at block 1120, the Web browser application 24 renders the contents of the Web page 26 to be viewable. This includes displaying output provided by the Web part objects 28 and any other viewable data contained on the Web page 26.

The routine 1100 continues to block 1122, where system events are received within the Web browser application 24. For instance, a user may select a region within a displayable portion provided by a Web part object 28. In order to capture such events, the routine 1100 continues to block 1124, where a determination is made as to whether an event is generated within a display provided by a Web part object 28 that implements a provider interface. If no such event has been generated, the routine 1100 branches back to block 1122.

If, at block 1124, it is determined that an event has been generated within a Web part object 28 that implements a provider interface, the routine 1100 continues to block 1126. At block 1126, the Web browser application 24 identifies the provider interface 46 as the appropriate listener to handle the generated event. Accordingly, the Web browser application 24 executes the provider interface script 46 at block 1126. Upon execution, the provider interface 46 calls the WPSC 27 with the data generated by the event. For instance, if a user selects a row within a spreadsheet provided by a Web part object 28 implementing a row provider interface, the provider interface 46 will call the WPSC 27 with the contents of the selected row.

From block 1128, the routine 1100 continues to block 1132, where the WPSC 27 determines whether a consumer object has registered to receive notification of a particular event type from a particular provider Web part. As described above, the consumer interface script 48 registers a Web part object 28B that implements a consumer interface with the WPSC 27 for such events. Accordingly, the WPSC 27 determines at block 1134 whether a consumer object has registered. If no consumer object has registered, the routine 1100 branches back to block 1122 where additional events are received. If a consumer object has registered with the WPSC 27 to receive notification of such events, the routine 1100 continues to block 1136.

At block 1136, the WPSC 27 calls a consumer interface script 48 associated with the registered Web part object 28B. The data received from the provider interface 46 in response to the occurrence of the event may be provided by the WPSC 27 to the consumer interface 48. At block 1138, the consumer interface script 48 receives the event and the data describing the event and calls the appropriate interface on the consumer Web part object 28B. At block 1140, the consumer Web part object 28B takes the appropriate action based on the contents of the event and the particular consumer interface implemented. For instance, as described above, according to one implemented interface, the received data may be utilized to filter data provided by the Web part object 28B. From block 1140, the routine 1100 returns to block 1122 where additional events are received and processed.

It should be appreciated that although the sequence of events described above with reference to the routines 1100 and 1150 have been described as executing in series, many of these events may actually execute in parallel. Moreover, it should be appreciated that although the description herein is of a single Web part object 28A implementing a provider interface 46 and a consumer Web part object 28B implementing a single consumer interface 48, each of these Web part objects may implement multiple consumer or provider interfaces. Moreover, each page may have any number of Web part objects contained therein and implementing any number of consumer or provider interfaces. It should further be understood that the various provider and consumer interfaces described herein are merely illustrative and that other types of interfaces may be provided and utilized with Web part objects providing other types of functionality.

Based on the foregoing, it should be appreciated that the various embodiments of the invention provide a method, system, apparatus, computer-readable medium for dynamically implementing an object interface at runtime. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for implementing an object interface at runtime, the method comprising:
   receiving, at a computer, a request for a resource, the resource including an object;
   determining whether an interface should be implemented at runtime for the object, wherein determining whether the interface should be implemented at runtime for the object comprises,
      retrieving a solution specification file comprising data indicating whether the object interface should be created and indicating a pointer to a map, and
      determining based on the data whether the object interface should be created; and
   in response to determining that an interface should be implemented for the object, generating program code for implementing the interface and returning the resource and the program code for implementing the object interface in response to the request.

2. The method of claim 1, wherein the solution specification file further comprises one or more parameters defining the implementation of the object interface and wherein generating program code for implementing the object interface comprises generating program code based on the parameters for implementing the object interface.

3. The method of claim 2, further comprising generating an intermediary object for coordinating communication between one or more objects and returning the intermediary object in response to the request.

4. The method of claim 3, further comprising executing the object, the intermediary object, and the program code implementing the object interface.

5. The method of claim 4, wherein executing the program code implementing the object interface comprises registering the object with the intermediary object as an event consumer.

6. The method of claim 5, wherein executing the program code implementing the object interface further comprises receiving notice of an event from the intermediary object and calling the object in response to receiving notice of the event.

7. The method of claim 4, wherein executing the program code implementing the object interface comprises notice of an event generated directed toward the object and, in response to the event, calling the intermediary object with information related to the event.

8. A computer-readable storage medium comprising computer-executable instructions which, when executed by a computer, cause the computer to perform the method of claim 1.

9. A computer-controlled apparatus capable of performing the method of claim 1.

10. A system for implementing an object interface at runtime, the system comprising:
   a server computer operative to receive a request for a resource including an object, to generate program code implementing an object interface for the object, and to return the program code implementing the object interface with the resource in response to the request wherein the server computer is further operative to render an intermediary object for coordinating communication between one or more objects into the resource; and a client computer operative to request a resource from the server computer, to receive from the server computer the resource and program code implementing the object interface for the object, and to render the resource, the program code implementing the object interface, and the object, wherein the client computer is further operative to execute the intermediary object, the object interface being configured to call the intermediary object in response to the occurrence of an event of a specified type.

11. The system of claim 10, wherein the object comprises a provider object and wherein the interface comprises a provider interface for providing data from the object to a consumer object.

12. The system of claim 11, wherein the client computer is further operative to detect an event directed toward the provider object, and to execute the program code implementing the object interface in response to detecting the event.

13. The system of claim 12, wherein the program code implementing the object interface is operative to provide data relating to the event to the intermediary object in response to the occurrence of the event.

14. The system of claim 10, wherein the object comprises a consumer object and wherein the program code implementing the object interface is operative to register the consumer object with the intermediary object as an event consumer.

15. The system of claim 14, wherein the program code implementing the object interface is further operative to receive notice of an event from the intermediary object and to call the consumer object in response to receiving the notice.

16. A method for implementing one or more object interfaces at runtime, the method comprising:
    receiving, at a computer, a request for a web page including one or more client side objects;
    in response to the request, determining whether one or more interfaces should be implemented for the client side objects;
    in response to determining that one or more interfaces should be implemented, retrieving parameters defining the interfaces and generating program code for implementing the interfaces based on the parameters;
    returning the requested client side objects, the web page, and the program code implementing the interfaces in response to the request; and
    returning, in response to the request, an intermediary object for coordinating communication between the one or more client side objects the intermediary object being called in response to the occurrence of an event of a specified type.

17. The method of claim 16, wherein one of the client side objects is a provider object that supports a provider interface, and wherein the code for implementing the interface comprises code for receiving data from the provider object and calling the intermediary object with the received data.

18. The method of claim 16, wherein one of the client side objects is a consumer object that supports a consumer interface, and wherein the code for implementing the interface comprises code for registering with the intermediary object as an event consumer and for receiving event notifications from the intermediary object.

19. The method of claim 16, wherein one of the client side objects is a provider consumer object that supports both a provider interface and a consumer interface, and wherein the code for implementing the interface comprises code for receiving data from the provider object and calling the intermediary object with the received data and wherein the code for implementing the interface comprises code for registering with the intermediary object as an event consumer and for receiving event notifications from the intermediary object.

20. A computer-readable storage medium comprising computer-executable instructions which, when executed by a computer, cause the computer to perform the method of claim 16.

21. A computer-controlled apparatus capable of performing the method of claim 16.

22. The method of claim 1, wherein retrieving the solution specification file comprising the data indicating whether the object interface should be created and indicating the pointer to the map comprising a map configured to identify to the requested object the location of the data to be utilized by the object.

23. The method of claim 1, wherein retrieving the solution specification file comprising the data indicating whether the object interface should be created and indicating the pointer to the map comprising a map configured to identify to the requested object the location of the data to be utilized by the object and to describe a format in which this data is to be presented.

24. The method of claim 1, wherein retrieving the solution specification file comprising the data indicating whether the object interface should be created and indicating the pointer to the map comprising an XML map.

* * * * *